United States Patent

[11] 3,545,490

[72] Inventor Bill S. Burrus
 Tulsa, Oklahoma
[21] Appl. No. 674,410
[22] Filed Oct. 11, 1967
[45] Patented Dec. 8, 1970
[73] Assignee Combustion Engineering Inc.
 New York, New York
 a corporation of Delaware

[54] FLUID CONDUIT COUPLING
 1 Claim, 3 Drawing Figs.
[52] U.S. Cl. .................................................... 137/614.06,
 251/149.2
[51] Int. Cl. ............................................. F16k 31/528
[50] Field of Search ....................................... 137/614.06,
 614.02, 614.03, 614.04; 251/149.9, 149.2, 340,
 229; 166/224, 226

[56] References Cited
UNITED STATES PATENTS
| 2,991,090 | 7/1961 | De Cenzo | 137/614.02 |
| 3,301,272 | 1/1967 | Petty John | 137/614.06 |
| 3,035,808 | 5/1962 | Knox | 166/224 |

Primary Examiner—William F. O'Dea
Assistant Examiner—William H. Wright
Attorney—Arthur L. Wade ABSTRACT: A pair of heads, each attached to a section of fluid conduit having movable parts which mechanically lock the heads together before valves within each head aline to communicate the fluid conduit sections.

PATENTED DEC 8 1970

INVENTOR.
BILL S. BURRUS

BY Arthur L Wade

ATTORNEY

INVENTOR.
BILL S. BURRUS

FLUID CONDUIT COUPLING

BACKGROUND OF THE INVENTION

1. Field of the Invention

The present invention relates to the connection and disconnection of fluid conduits within a subsea environment. More particularly, the invention relates to couplings for conduits which seal fluids against transfer between their environment and their interior prior to communicating their conduits.

2. Description of the Prior Art

The coupling art is well developed. Couplings continue to be developed for communicating conduits together. The conduits may be small, metallic tubing or large, flexible hose. It may be required to permanently connect the conduit sections through their couplings or provide for their ready disconnection.

Within the art of couplings there are peculiar requirements imposed by the hostile environment of the sea. The oil industry is demanding simple couplings which reduce to a minimum the leakage from their conduits when connection takes place and, of course, reduction to a minimum the intake of sea water. These couplings must be single enough to lend themselves to straight line actuation in automated systems.

SUMMARY OF THE INVENTION

A principal object of the present invention is to seal the two halves of a coupling for conduit sections together and then communicate the conduit sections together through the coupling.

Another object is to positively lock the two halves of the coupling together before the sections are communicated.

Another object is to provide a single structure which will move in a straight line to first lock the halves in a seal and then valve the conduits into straight-through communication in sequence when the coupling is made up and then isolate the conduits before unlocking the halves when the coupling is broken down.

The present invention contemplates the two halves of a coupling to be mated formed as male and female structures whose faces are brought together to seal against the transfer of fluid across their sealing surfaces. Each half is connected to an end of a conduit section to be communicated through the coupling in a straight-through flow, and a single external collar structure is moved in a straight line to actuate locking structure and valving structure within the halves. Different positions of the collar in its straight line travel along the external surface of the sealed halves actuates locking structure between the halves and valves which form a straight-through passage between the conduit sections. The collar is linked to the lock and valves to first actuate the lock and then open the valves when the coupling is made up. When the coupling is to be broken down the collar causes the reverse of the sequence, first closing the valves and then unlocking the halves.

BRIEF DESCRIPTION OF THE DRAWINGS

Other objects, advantages and features of this invention will become apparent to one skilled in the art upon consideration of the written specification, appended claims, and attached drawings, wherein;

DESCRIPTION OF THE PREFERRED EMBODIMENT

General

The invention is embodied in the halves of coupling structure, each of which is permanently mounted on the end of a conduit section. One half is arranged to more or less fit inside the other, so they can be logically designated as male and female halves.

Locking structure extends through the overlapping sidewalls of the halves. Each half has a valve member whose passages aline to fully communicate the conduit sections through the coupling. Alternately, the valves rotate to isolate their conduits and prevent escape of fluid therefrom as well as entry of fluid thereinto.

Both the valve structure and the locking structure are actuated by a single movable collar member on the external surface of the coupling. The collar is moved in substantially a straight line to actuate the locking and valve means in sequence. The simplicity of this single element actuation to perform multiple results requires only a simple operator. Automation of a system utilizing this coupling is the more feasible with an arrangement of this nature.

Figure 1:
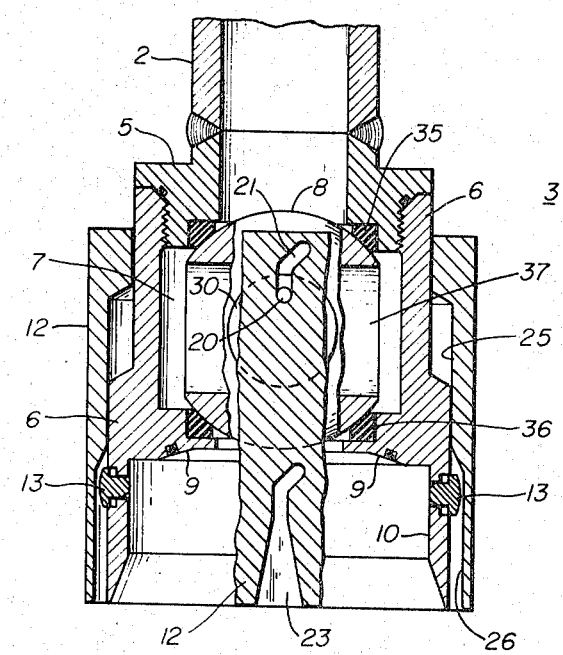
FIG. 1 is a sectioned elevation of two-disengaged coupling halves in which the present invention is embodied.
Figure 1:
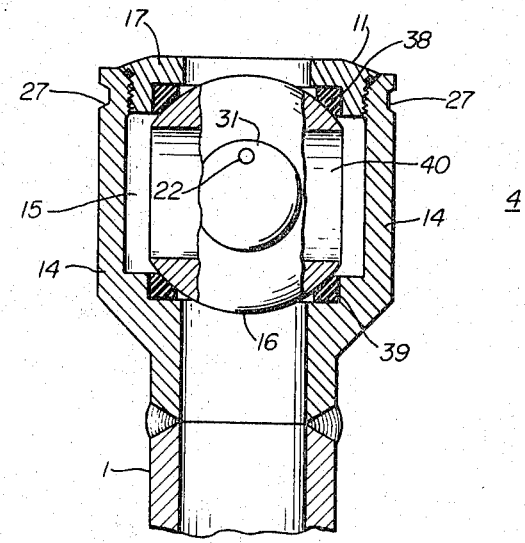

FIG. 1 - Coupling Halves Separated

Conduit sections 1 and 2 are to be communicated through the novel coupling. Female half 3 is attached to conduit section 2 and male half 4 is attached to section 1. The drawing discloses the halves alined, ready to engage each other to consummate the communication.

Female half 3 comprises a base 5 which is welded, or otherwise attached, to conduit section 2. Attached to base 5 is a shoe 6 which provides a cavity 7 for a valve element 8. A face area 9 is provided on the end of shoe 6 for engagement with a similar face of the male half. Face 9 is more specifically, a shoulder within the bore 10 of shoe 6. Male half 4 fits into this bore to bring its face 11 into the engagement with face 9. A collar 12 will subsequently slide along the external wall of shoe 6 while mechanically linked with valve 8 and lock pins 13.

Male half 4 comprises a body 14 attached to conduit section 1. Body 14 is externally sized for insertion within walls 10 and provides a cavity 15 in which valve 16 is mounted. Retainer 17 on the end of body completes the mount for valve 16 and specifically provides the sealing face 11 which will be subsequently brought into engagement with the sealing face 9 of shoe 6.

Figure 2:
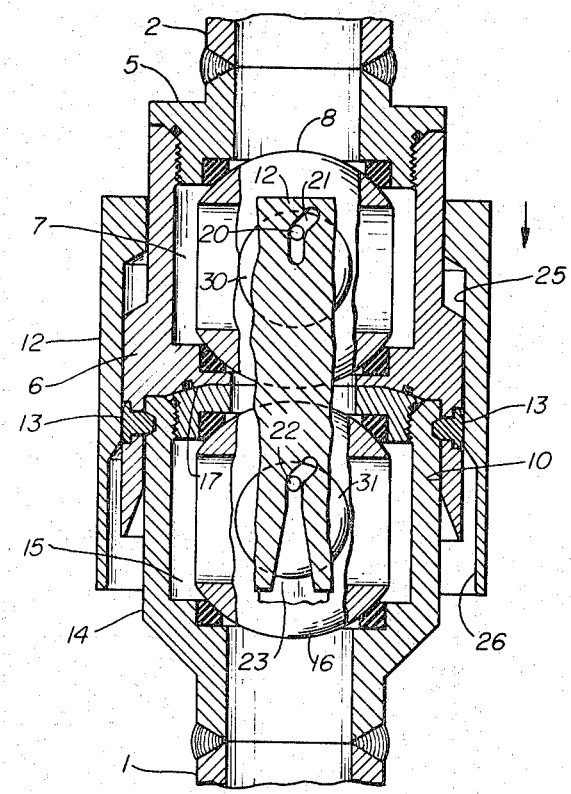
FIG. 2 discloses the halves of FIG. 1 joined and locked together.

FIG. 2 - Faces 9 and 11 Sealed and the Halves Locked

Body 14 has been inserted into the bore of shoe 6 and faces 9 and 11 engaged. A form of O-ring has been disclosed to aid the sealing between these faces.

There is a very small, insignificant cavity remaining between the valves 8 and 16 and within the coupling. When the halves are brought together beneath the surface of the sea, a small amount of this sea water remains within the coupling to find its way into the conduits. However, this cavity and the volume of sea water trapped during make up, is not large enough to be of any importance to the operation of the systems utilizing the fluid of the conduits connected with the coupling.

Both valve 8 and valve 16 have a mechanical connection with collar 12. Pin 20 extends from valve 8 into slot 21 of collar 12. Pin 22 extends from valve 16 into slot 23 of collar 12. Pin 20 is captured permanently within slot 21 while slot 23 is open at its bottom to receive pin 22 as male half 4 is inserted in female half 3. When collar 12 completely reciprocates along the outside of the shoe 6, valves 8 and 16 will be actuated.

In this FIG. 2 collar 12 is disclosed as having been moved down far enough to position surface 25 over the heads of pins 13. In FIG. 1, surface 26 was positioned over pins 13 which permitted pins 13 to withdraw radially outward far enough to remain disengaged from body 14. In FIG. 2, surface 25 has forced pins 13 into indentations 27 (see FIG. 1) and thereby lock the head halves together.

The halves being sealed and locked together, the collar is next used to actuate valves 8 and 16 to aline their passages in a straight-through connection of conduits 1 and 2. A continuation of the travel of collar 12 will carry out the actuation and open valves 8 and 16 after the sealing and locking of FIG. 2 has taken place.

Figure 3:
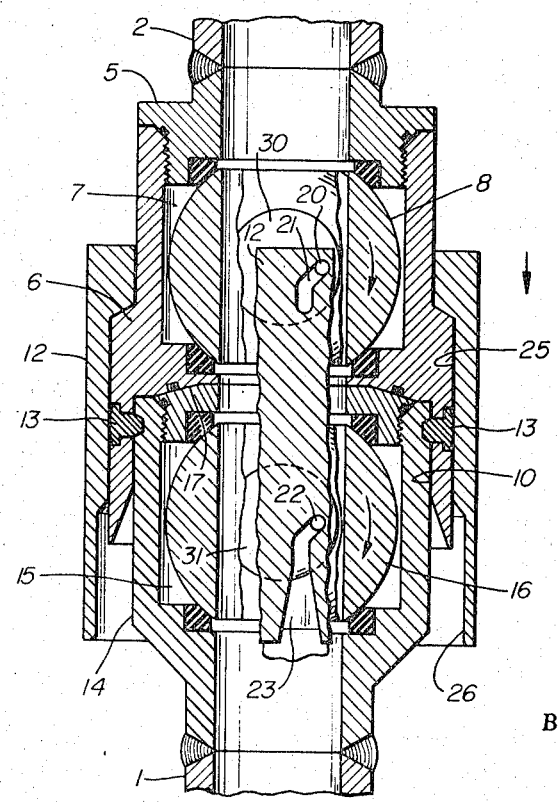
FIG. 3 discloses the halves of FIGS. 1 and 2 locked and their valves actuated to communicate their conduit sections.

FIG. 3 - Halves Locked and Valves Actuated

Each of valves 8 and 16 rotate within their respective heads. In FIGS. 1 and 2, the passages of the valves are positioned 90° to the alinement requirement for straight-through communication. When positioned as disclosed in FIGS. 1 and 2, the bodies of the valves seal their cavities against transfer of fluid from their conduit sections and into their conduit sections.

Each of the two valves 8 and 16 rotate on bosses journaled in the walls of their cavities. Boss 30 of valve 8 is journaled in the wall of shoe 6 and boss 31 of valve 16 is journaled in the wall of body 14. Pins 20 and 22 are mounted off center in the bosses, protruding out into grooves 21 and 23. As grooves 21, 23 are carried downward, as viewed in the drawings, they force the pins to rotate the valves 90°, alining their passages in straight-through communication. FIG. 3 discloses this final position of collar 12, valves 8 and 16 rotated for the desired communication.

Conclusion

General reference has been made to the cooperation of the coupling structures. Once female half 3 has male half 4 inserted, collar 12 moves along their outside to first lock the halves together and then actuate the valve elements 8 and 16 to provide unobstructed straight-through flow of fluids between conduit sections 1 and 2.

The locking function is embodied in pins 13 positioned into indentations 27 and withdrawn therefrom. It is obvious, from inspection of FIG. 1, that the indentations have beveled sides which match complemental beveled surfaces on the ends of pins 13. Pins 13 will not maintain a locking bridge between shoe 6 and body 14 unless held in engagement with indentations 27. The heads can be pulled apart, pins 13 unseating from indentations 27, if the pins are free to move radially outward.

Surface 25 of collar 12 will hold pins 13 in place. When collar 12 is moved to the FIG. 2 position, the pins cannot retract and the heads are thereby locked together.

It is while the heads are locked together that actuation of valves 8 and 16 take place. The direction of the slots determine the desired sequence of locking and valve actuation.

In the drawings it is evident from inspection that the valves are generally spherical. The spherical surface of valve 8 rests on seal rings 35 and 36. With valve passage 37 in cavity 7, between the seal rings, conduit 2 is isolated from communication with any external fluid.

Movement of collar 12 downward to the FIG. 2 position does not actuate valve 8. Pin 20 simply moves up the vertical portions of slot 21 while surface 25 is moved into a locking position over pins 13. It is the next part of the downward travel of collar 12 which actuates valve 8.

Actuation of valve 8 takes place at the same time valve 16 is actuated. Valve 16 is also generally spherical, sealing to rings 38 and 39. Passage 40 is also isolated in cavity 15, sealing conduit 1.

Slot 23 is open downward, slightly funneled in shape to receive pin 22 as the halves are joined. No actuation takes place with valve 16 as collar 12 moves downward to the FIG. 2 position. Pin 22 simply moves up to the point where slot 23 changes direction to an angle to the vertical.

The upper halves of both slot 21 and slot 23 are directed at the angle which will force pins 20 and 22 to rotate their bosses and valves one-quarter turn as collar 12 moves the distance from its FIG. 2 position to its FIG. 3 position. So actuated, the passages 37 and 40 aline and give straight-through communication between conduit section 2 and conduit section 1.

As the collar 12 is moved from the FIG. 3 position to the FIG. 2 position, the slots actuate the valves to close. The FIG. 1 position is then assumed and the heads unlock with no transfer of fluid between the conduits and their environment.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted as illustrative and not in a limiting sense.

I claim:

1. A coupling for fluid conduit, including:

a pair of heads, each of which is adapted to connect to a section of fluid conduit, arranged to contact and seal together in prevention of the transfer of fluid into and out of the conduit sections;

an actuating collar movable only in a straight line along the outside of the heads;

locking pins positioned to extend between mating holes in each of the heads, arranged so that the collar moves and contacts the pins when the heads are in contact and retains the pins in the mating holes of the heads to mechanically lock the heads together;

a valve in each head positioned to prevent the escape of fluid from either conduit section before the heads are locked together in their sealed engagement;

a first pin mounted on the valve in one of the heads and captured permanently by a first groove in the collar, the first groove arranged axially with the conduit and the collar for some predetermined distance and arranged at an angle to the axis of conduit and collar for some predetermined distance;

a second pin mounted on the valve in the other of the heads and engaged by a second groove in the collar, the second groove being open to receive the second pin when the heads are placed in contact, and the second groove arranged axially with the conduit and the collar for some predetermined distance and arranged at an angle to the axis of conduit and collar for some predetermined distance;

whereby the groove-and-pin linkage connecting the actuating collar and valves serially locks the heads together over the axial travel portion of the pins in the grooves and actuates the valves in each head over the angled travel portion of the pins in the grooves, the actuating collar moving in a straight line to establish communication between the fluid conduit section; and whereby substantially no transfer of fluid between the conduit and the environment thereof is experienced during either the coupling or uncoupling of the conduit.